(12) United States Patent
Meldahl et al.

(10) Patent No.: US 8,797,549 B2
(45) Date of Patent: Aug. 5, 2014

(54) INTERFEROMETRIC METHODS AND APPARATUS FOR SEISMIC EXPLORATION

(75) Inventors: Paul Meldahl, Stavanger (NO); Eiolf Vikhagen, Trondheim (NO)

(73) Assignee: Statoil Petroleum AS, Stavanger (NO)

( * ) Notice: Subject to any disclaimer, the term of this patent is extended or adjusted under 35 U.S.C. 154(b) by 221 days.

(21) Appl. No.: 12/920,273

(22) PCT Filed: Feb. 25, 2009

(86) PCT No.: PCT/GB2009/000523
§ 371 (c)(1),
(2), (4) Date: Dec. 7, 2010

(87) PCT Pub. No.: WO2009/106820
PCT Pub. Date: Sep. 3, 2009

(65) Prior Publication Data
US 2011/0102806 A1    May 5, 2011

(30) Foreign Application Priority Data
Feb. 28, 2008 (GB) .................................. 0803701.2

(51) Int. Cl.
*G01B 11/02* (2006.01)
(52) U.S. Cl.
USPC ........................................................ 356/511
(58) Field of Classification Search
CPC .............................. G01H 9/00; G01B 11/2331
USPC ......... 356/511, 512, 513, 514, 516, 503, 504, 356/601, 609
See application file for complete search history.

(56) References Cited

U.S. PATENT DOCUMENTS

| | | | |
|---|---|---|---|
| 3,275,097 A | 9/1966 | Pavey, Jr. | |
| 3,711,200 A | 1/1973 | Maughmer | |

(Continued)

FOREIGN PATENT DOCUMENTS

| | | |
|---|---|---|
| DE | 3430820 | 3/1986 |
| DE | 4004228 | 8/1991 |

(Continued)

OTHER PUBLICATIONS

Agneni et al., Image Processing for Fringe Underwrapping in Speckle Interferometry, Proceedings of the SPIE, SPIE, Bellingham, VA 4062: 1479-1484 (2000).

(Continued)

*Primary Examiner* — Gregory J Toatley
*Assistant Examiner* — Shawn Decenzo
(74) *Attorney, Agent, or Firm* — Patterson Thuente Pedersen, P.A.

(57) ABSTRACT

A interferometer apparatus for studying the surface of an object, the apparatus comprising a source producing an object beam of coherent light, a source producing a reference beam which is coherent with the object beam, and a detector or a plurality of detectors arranged in a line or array, wherein the apparatus is arranged such that the object beam is diverging or substantially collimated, and wherein, in use the diverging or substantially collimated object beam is directed towards the surface of the object to produce a reflected object beam reflected from the surface of the object, the detector(s) is/are focused to a point beneath the surface of the object, and the reflected object beam is combined with the reference beam and detected by the detector(s). Also provided is a corresponding method for conducting an interferometric study of the surface of an object. The surface of the object may be a sea floor, and the interferometer apparatus may be for studying the movement of particles on the sea floor in response to a seismic event.

20 Claims, 12 Drawing Sheets

(56) References Cited

U.S. PATENT DOCUMENTS

| | | | |
|---|---|---|---|
| 3,804,521 A | 4/1974 | Sprague | |
| 3,943,278 A * | 3/1976 | Ramsey, Jr. | 348/130 |
| 4,311,383 A | 1/1982 | Ohtsubo | |
| 4,470,696 A | 9/1984 | Ballard | |
| 4,576,479 A | 3/1986 | Downs | |
| 4,583,095 A | 4/1986 | Peterson | |
| 4,843,597 A | 6/1989 | Gjessing et al. | |
| 4,862,422 A | 8/1989 | Brac | |
| 4,992,995 A | 2/1991 | Favret | |
| 5,018,862 A | 5/1991 | Aiello | |
| 5,029,023 A | 7/1991 | Bearden et al. | |
| 5,070,483 A | 12/1991 | Berni | |
| 5,109,362 A | 4/1992 | Berni | |
| 5,144,588 A | 9/1992 | Johnston et al. | |
| 5,159,406 A | 10/1992 | Adler et al. | |
| 5,317,383 A | 5/1994 | Berni | |
| 5,444,619 A | 8/1995 | Hoskins | |
| 5,477,324 A | 12/1995 | Berthelot et al. | |
| 5,493,398 A | 2/1996 | Pfister | |
| 5,587,785 A | 12/1996 | Kato et al. | |
| 5,623,307 A | 4/1997 | Kotidis et al. | |
| 5,724,309 A | 3/1998 | Higgs | |
| 5,777,742 A * | 7/1998 | Marron | 356/458 |
| 5,783,752 A | 7/1998 | Thorburn et al. | |
| 5,892,732 A | 4/1999 | Gersztenkorn et al. | |
| 5,907,404 A | 5/1999 | Marron et al. | |
| 5,940,777 A | 8/1999 | Keskes | |
| 5,987,388 A | 11/1999 | Crawford et al. | |
| 5,995,222 A * | 11/1999 | Kanaya et al. | 356/508 |
| 6,011,557 A | 1/2000 | Keskes et al. | |
| 6,011,753 A | 1/2000 | Chien | |
| 6,028,817 A | 2/2000 | Ambs | |
| 6,049,760 A | 4/2000 | Scott | |
| 6,081,481 A | 6/2000 | Sabatier et al. | |
| 6,115,127 A | 9/2000 | Brodeur et al. | |
| 6,134,966 A | 10/2000 | Donskoy et al. | |
| 6,141,440 A | 10/2000 | Melen | |
| 6,188,482 B1 | 2/2001 | Cloud | |
| 6,277,075 B1 | 8/2001 | Torp et al. | |
| 6,301,193 B1 | 10/2001 | Martin et al. | |
| 6,456,565 B1 | 9/2002 | Grall et al. | |
| 6,473,695 B1 | 10/2002 | Chutov et al. | |
| 6,642,506 B1 | 11/2003 | Nahum et al. | |
| 6,725,163 B1 | 4/2004 | Trappe et al. | |
| 6,735,526 B1 | 5/2004 | Meldahl et al. | |
| 6,788,618 B2 | 9/2004 | Clayton et al. | |
| 6,873,571 B2 | 3/2005 | Clayton et al. | |
| 7,110,120 B2 * | 9/2006 | Shigeki et al. | 356/493 |
| 7,116,427 B2 | 10/2006 | Baney et al. | |
| 7,242,481 B2 | 7/2007 | Shpantzer et al. | |
| 7,317,538 B2 | 1/2008 | Wada et al. | |
| 7,423,279 B2 | 9/2008 | Heinz et al. | |
| 7,463,549 B2 | 12/2008 | Naess | |
| 7,583,387 B2 * | 9/2009 | Meldahl et al. | 356/498 |
| 7,619,744 B2 | 11/2009 | Liess | |
| 7,660,188 B2 | 2/2010 | Meldahl | |
| 7,708,695 B2 | 5/2010 | Akkermans et al. | |
| 7,720,609 B2 | 5/2010 | Meldahl | |
| 7,933,003 B2 | 4/2011 | Meldahl et al. | |
| 2003/0060102 A1 | 3/2003 | Ambs | |
| 2004/0022125 A1 | 2/2004 | Clayton et al. | |
| 2004/0228214 A1 | 11/2004 | Tulett | |
| 2005/0288862 A1 | 12/2005 | Rode et al. | |
| 2008/0316496 A1 | 12/2008 | Meldahl et al. | |
| 2009/0025480 A1 | 1/2009 | Aharoni | |
| 2009/0128800 A1 | 5/2009 | Meldahl et al. | |
| 2010/0128561 A1 | 5/2010 | Meldahl et al. | |
| 2010/0332139 A1 | 12/2010 | Bruun et al. | |
| 2011/0046885 A1 | 2/2011 | Bussat et al. | |
| 2011/0085420 A1 | 4/2011 | Bussat et al. | |

FOREIGN PATENT DOCUMENTS

| | | |
|---|---|---|
| DE | 4213638 | 10/1993 |
| EP | 0018053 | 10/1980 |
| EP | 1 001 249 A1 | 5/2000 |
| EP | 1403662 | 3/2004 |
| FR | 2765344 | 12/1998 |
| GB | 673971 | 6/1952 |
| GB | 2001021 | 1/1979 |
| GB | 2243968 | 11/1991 |
| GB | 2331971 | 6/1999 |
| GB | 2342081 | 4/2000 |
| GB | 2347744 | 9/2000 |
| GB | 2364388 | 1/2002 |
| GB | 2410635 | 8/2005 |
| GB | 2411001 | 8/2005 |
| GB | 2416835 | 8/2006 |
| JP | 59162405 | 9/1984 |
| JP | 2002286408 | 10/2002 |
| JP | 2005275540 | 10/2005 |
| JP | 2006-118989 | 5/2006 |
| WO | WO 91/13373 | 9/1991 |
| WO | WO 96/18116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO 02/073241 | 9/2002 |
| WO | WO 2004/003589 A1 | 1/2004 |
| WO | WO 2004/044617 | 5/2004 |
| WO | WO 2005/078479 A1 | 8/2005 |
| WO | WO 2006/011826 | 2/2006 |
| WO | WO 2006/013358 A1 | 2/2006 |
| WO | WO 2007/020396 A1 | 2/2007 |
| WO | WO 2007/141725 | 12/2007 |

OTHER PUBLICATIONS

Application and File History for U.S. Appl. No. 11/659,383, filed May 29, 2007, inventor Meldahl.

International Search Report for PCT/GB2005/003038 dated Nov. 4, 2005 and Great Britain Search Report for GB 0417370.4 dated Sep. 22, 2005.

Artman, Brad, "Imaging passive seismic data," *Geophysics*, vol. 71, No. 4, pp. SI177-SI187, SP-002479903 (Jul.-Aug. 2006).

Berni, "Remote sensing of seismic vibrations by laser Doppler interferometry" Geophysics. vol. 59, No. 12. pp. 1856-1867. Dec. 1994.

Castagna, John P., et al., "Instantaneous spectral analysis: Detection of frequency shadows associated with hydrocarbons," *The Leading Edge*, XP-002461160, pp. 120-127 (Feb. 2003).

Daneshvar, M. Reza, et al., "Passive seismic imaging using microearthquakes," *Geophysics*, vol. 60, No. 4, pp. 1178-1186 (Jul.-Aug. 1995).

Hohl, Detlef, et al., "Passive Seismic Reflectivity Imaging with Ocean-Botton Cable Data," *SEG/New Orleans 2006 Annual Meeting*, XP-002-156524343, pp. 1560 (2006).

Meldahl et al., Identifying Faults and Gas Chimneys Using Multiattributes and Neural Networks, May 2001. The Leading Edge, pp. 474-482.

Preliminary Examination Report—PCT/GB99/03039. Oct. 10, 2000.

International Search Report—PCT/GB2005/000075 dated Mar. 2, 2006 and GB 0500484.1 dated Apr. 12, 2006.

International Search Report—PCT/GB2007/004348 dated Feb. 27, 2009 and Search Report GB 0622697.1 dated Feb. 16, 2007.

International Search Report—PCT/GB2008/051223 dated Apr. 29, 2010.

International Search Report—PCT/GB2008/004243 dated May 7, 2009.

International Search Report—PCT/GB2006/003000 dated Dec. 29, 2006 and Search Report for GB 0516720.0 dated Nov. 8, 2006.

International Search Report—PCT/GB99/03039 dated Jan. 12, 2000.

Wood et al., Deceased Stability of Methane Hydrates in Marine Sediments Owing to Phase-Boundry Roughness, Dec. 12, 2002, Nature. vol. 420. pp. 656-660.

(56) References Cited

OTHER PUBLICATIONS

Application and File History for U.S. Appl. No. 11/990,558, filed Feb. 4, 2009, inventor Meldahl et al.
Great Britain Search Report for Great Britain Application No. GB0803701.2 dated Jun. 25, 2008.

Y.I.Ostrovsky "The Holography and its usage"; Nauka, Leningrad 1973, Chapter I. "How to Obtain Holograms and to Recover Waves." 1 page. English Translation provided.

* cited by examiner

INTERFEROMETRIC METHODS AND APPARATUS FOR SEISMIC EXPLORATION

PRIORITY CLAIM

The present application is a National Phase entry of PCT Application No. PCT/GB2009/000523, filed Feb. 25, 2009, which claims priority from Great Britain Application No. 0803701.2, filed Feb. 28, 2008, the disclosures of which are hereby incorporated by reference herein in their entirety.

TECHNICAL FIELD

This invention relates to interferometer apparatus and related methods. It is particularly applicable, but by no means limited, to seismic exploration using laser interferometry.

BACKGROUND

WO 2004/003589 describes a seismic exploration and imaging system for producing seismic survey reports of subsea geological structures. In such a survey, a seismic event is applied to the seabed. The response to the seismic event in the rock of the seabed includes a compression wave (P-wave) and a shear wave (S-wave). Particles on the sea floor move in response to the P-wave and S-wave, the particles' movement being representative of the two waves. Detecting apparatus in the sea is used to monitor and record the movements of the particles, thus enabling the P-wave and S-wave to be measured and analysed. P-waves are considered well suited to imaging structures, while S-waves are well suited to determining rock and fluid characteristics.

WO 2005/078479, WO 2006/013358 and WO 2007/020396 disclose laser interferometry techniques suitable for monitoring and recording the movement of particles on the sea floor in response to the P-wave and S-wave. A plurality of interferometers may be towed on cables behind a surface vessel or submarine, the interferometers being arranged in one or more streamers. Alternatively the interferometers may be located on self-propelled vessels or submarines. In other applications, interferometers may be towed by, or located on, land vehicles or aircraft.

With conventional interferometry systems, a converging object beam is used which must be accurately focused on the surface of the object (e.g. the sea floor) being studied, or on a point below the surface of the object. Such focusing may be time consuming and may complicate the interferometry process. There is also a desire to improve the sensitivity of the interferometry system, such that finer detail may be captured. It would also be desirable to reduce problems with backscattering that are sometimes experienced with conventional interferometry systems.

SUMMARY

Embodiments relate to an interferometer apparatus for studying the surface of an object, the apparatus comprising: a source producing an object beam of coherent light; a source producing a reference beam which is coherent with the object beam; and a detector or a plurality of detectors arranged in an array; wherein the apparatus is arranged such that the object beam is diverging or substantially collimated; and wherein, in use: the diverging or substantially collimated object beam is directed towards the surface of the object to produce a reflected object beam reflected from the surface of the object; the detector(s) is/are focused to a point beneath the surface of the object; and the reflected object beam is combined with the reference beam and detected by the detector(s).

Thus, the object beam directed towards the surface under investigation is either diverging or substantially collimated, instead of being converging as is the case with conventional interferometer systems. Advantageously, with this new system, there is no need for focussing, thus greatly simplifying the interferometry process. Additionally, improved sensitivity may be achieved, and problems with backscattering may be reduced.

Thus, in some embodiments, the object beam may be substantially collimated. The terms "substantially collimated", or simply "collimated", as used herein should both be interpreted broadly, to encompass a beam having parallel rays, and also a beam whose rays are nearly parallel such that the beam does not converge or diverge significantly. We predict that, using collimated imaging, a gain factor twice that of other systems may be achieved.

The reflected object beam may also be substantially collimated.

In a first embodiment, the object beam and the reflected object beam have a common optical path. This enables the interferometer apparatus to have a compact and relatively straightforward design, with relatively few components.

In a second embodiment, the object beam and the reflected object beam have different optical paths. In such a case, the source of the object beam may be external from the detector(s).

In other embodiments, the object beam may be diverging.

In further embodiments, the geometry of the object beam is as though it emanates from a point source situated behind the actual source of the object beam, and the distance from the surface of the object to the said point source is approximately equal to the distance from the surface of the object to the focus point of the detector(s) beneath the surface of the object.

The "point source" mentioned above is an imaginary point, also referred to herein as a "virtual source", and is introduced for the purposes of defining the geometry of the beam emanating from the actual source of the object beam.

With all the embodiments, the sensitivity direction can change from location to location on the detector or array. In an embodiment, the sensitivity direction changes in a monotonian way, from one side of the detector or array, to the other side of the detector or array.

In an embodiment, the interferometer apparatus is arranged such that all light rays coming to a single point on the detector or array have the same sensitivity direction. This improves the signal quality in the interferometer.

In an embodiment, the detector or array has an equal sensitivity direction for all light waves coming to each point on the detector or array, for all distances to the surface of the object. This means that the system will not be sensitive to surface topography.

In an embodiment, the apparatus is configured to determine the movement of particles on the surface of the object from the sensitivity direction of the detector or array.

In an embodiment, the object beam and the reference beam are coherent laser beams.

In an embodiment, the object beam and the reference beam are derived from a common laser source.

The interferometer apparatus may be moveable relative to the surface of the object being studied. In such instances, the speed of movement of the apparatus, the sampling rate of the detector(s) and the size of the area of the surface illuminated by the object beam are preferably arranged so that sequential areas of the object studied overlap.

The interferometer apparatus may be configured to measure relative motion between the apparatus and the surface from the speckle pattern formed by the combination of the reflected object beam with the reference beam.

For applications in geological surveying, the surface of the object may be a sea floor, and the interferometer apparatus may be for studying the movement of particles on the sea floor in response to a seismic event. Accordingly, the beam source(s) and the detector(s) may be situated in a streamer.

In an embodiment, a method for conducting an interferometric study of the surface of an object is disclosed, the method comprising: arranging a source to produce a diverging or substantially collimated object beam of coherent light; arranging a source to produce a reference beam which is coherent with the object beam; arranging a detector or a plurality of detectors in an array; directing the diverging or substantially collimated object beam towards the surface of the object to produce a reflected object beam reflected from the surface of the object; focusing the detector(s) to a point beneath the surface of the object; and combining the reflected object beam with the reference beam and detecting them using the detector(s).

The method may further comprise moving the detector(s) relative to the surface of the object, and preferably also moving the object beam relative to the surface of the object. Particularly preferably the detector(s) and the object beam are moved at the same speed relative to the surface of the object. The speed of movement of the detector(s), the sampling rate of the detector(s) and the size of the area of the surface illuminated by the object beam are preferably arranged so that sequential areas of the object studied overlap.

The method may further comprise measuring relative motion between the apparatus and the surface from the speckle pattern formed by the combination of the reflected object beam with the reference beam.

The surface of the object may be a sea floor, and the method may be for studying the movement of particles on the sea floor in response to a seismic event.

The method may further comprise applying a seismic event to the sea floor.

The method may further comprise analysing data gathered from the detector(s) to derive representations of underlying strata.

The method may still further comprise assembling the representations as a depiction of the geological nature of the region.

BRIEF DESCRIPTION OF THE DRAWINGS

Embodiments of the invention will now be described, by way of example only, and with reference to the drawings in which.

DETAILED DESCRIPTION

Embodiments discussed herein represent the ways known to the applicant of putting the invention into practice. However, they are not the only ways in which this can be achieved.

Although the embodiments described below will be in relation to seismic exploration—in particular for studying the movement of particles on a sea floor in response to a seismic event—those skilled in the art will appreciate that the interferometric principles described herein may be applicable to the sensing of other surfaces, such as machine parts, metal sheets (e.g. to detect flaws) or surfaces which are susceptible to vibration (e.g. a window pane), provided an interference pattern can be formed that can be suitably interpreted by the detector apparatus.

Figure 1:
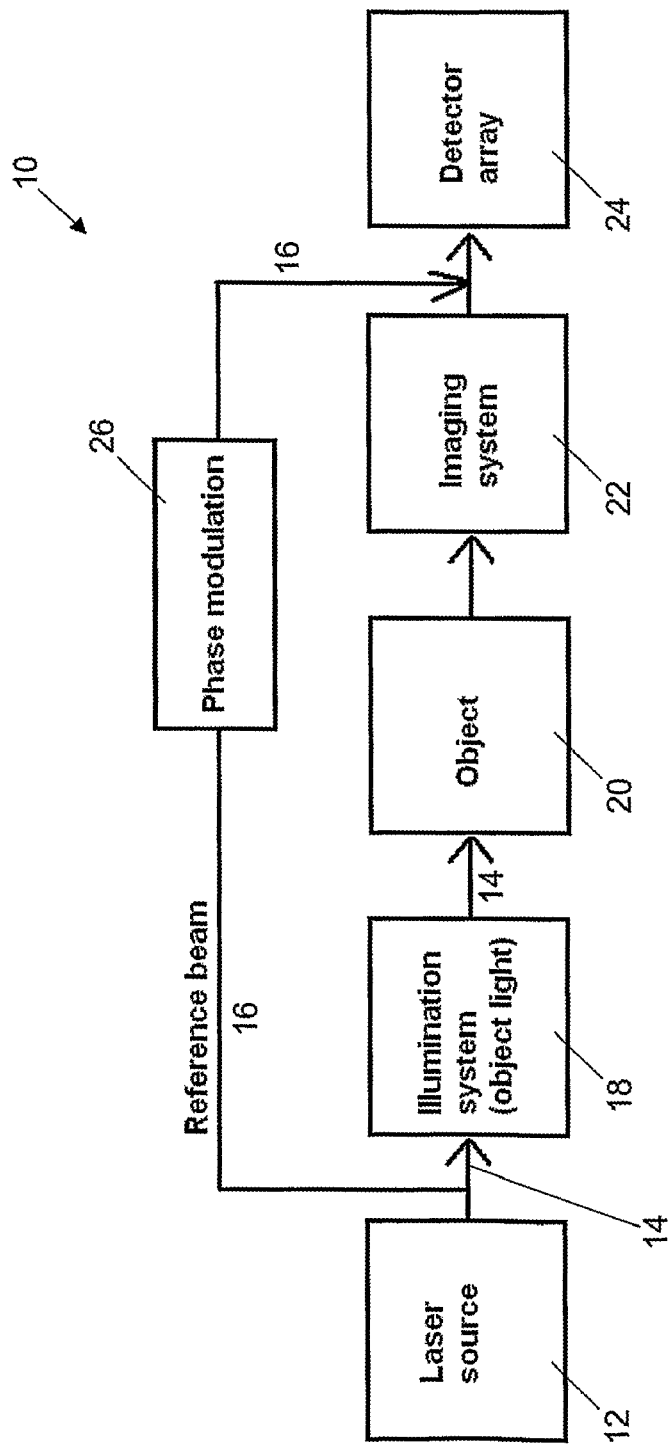
FIG. 1 illustrates the principal elements of an interferometer.

By way of an initial introduction, FIG. 1 illustrates the basic principles of an interferometer 10. The interferometer 10 consists of the following elements:

- One or more coherent light sources, for instance laser source(s) 12, where the laser source 12 is split into one or more object beams 14 and a reference beam 16.
- The object beam(s) 14 goes through an illumination system 18 consisting of optical elements such as lenses, mirrors, slits, gratings, diffraction patterns, holographic elements etc., to illuminate the surface of the object 20 at a point or over an area.
- The object beam 14 is reflected from the object 20 and passes through an imaging system 22 which also consists of optical elements such as lenses, mirrors, slits, gratings, diffraction patterns or holographic elements etc. The imaging system 22 can also be the same, or partly the same, as the illumination system 18, meaning that light can go both ways through or via the same optical elements.
- The object light coming from the object 20 is directed toward a detector line or a detector array 24. One example of a suitable detector array is a CCD (charge-coupled device), of the kind used in digital cameras, having an array of many thousands of sensor pixels. Indeed, a digital camera may be used to provide the detector array. The reference beam 16 is also arranged to illuminate the same detector line or detector array 24, to interfere with the object light.
- The optical signal on the detector line or detector array 24 is digitized to form a signal which is then processed in a computer system.
- The phase of the reference beam 16 and/or the object beam 14 may be controlled by a phase modulator 26.

The direction of the object light 14 can be controlled both on a large scale (e.g. greater than 10 degrees) and on a smaller scale, down to micro-degrees, for example. This direction control can be both for the direction toward the object surface and the direction toward the detector array 24, inside the interferometer 10. The direction can be adjusted and controlled, for example, by mirrors which can be tilted.

The interferometer 10 can also be equipped with accelerometers or other displacement and tilt measurement devices, to measure the displacements of the interferometer, so this displacement can be taken into consideration when the object displacements are calculated.

Signals from the accelerometers can also be used for direct steering of the phase modulator 26 on the reference beam 16 or the object beam 14, to adjust the spot position (see aspect 4 below) and to compensate for movements of the interferometer 10.

Several reference beams with known differences in optical path lengths can be used, with several detector arrays, to be able to calculate and eliminate phase variations due to frequency instabilities in the light (laser) source.

Figure 2:
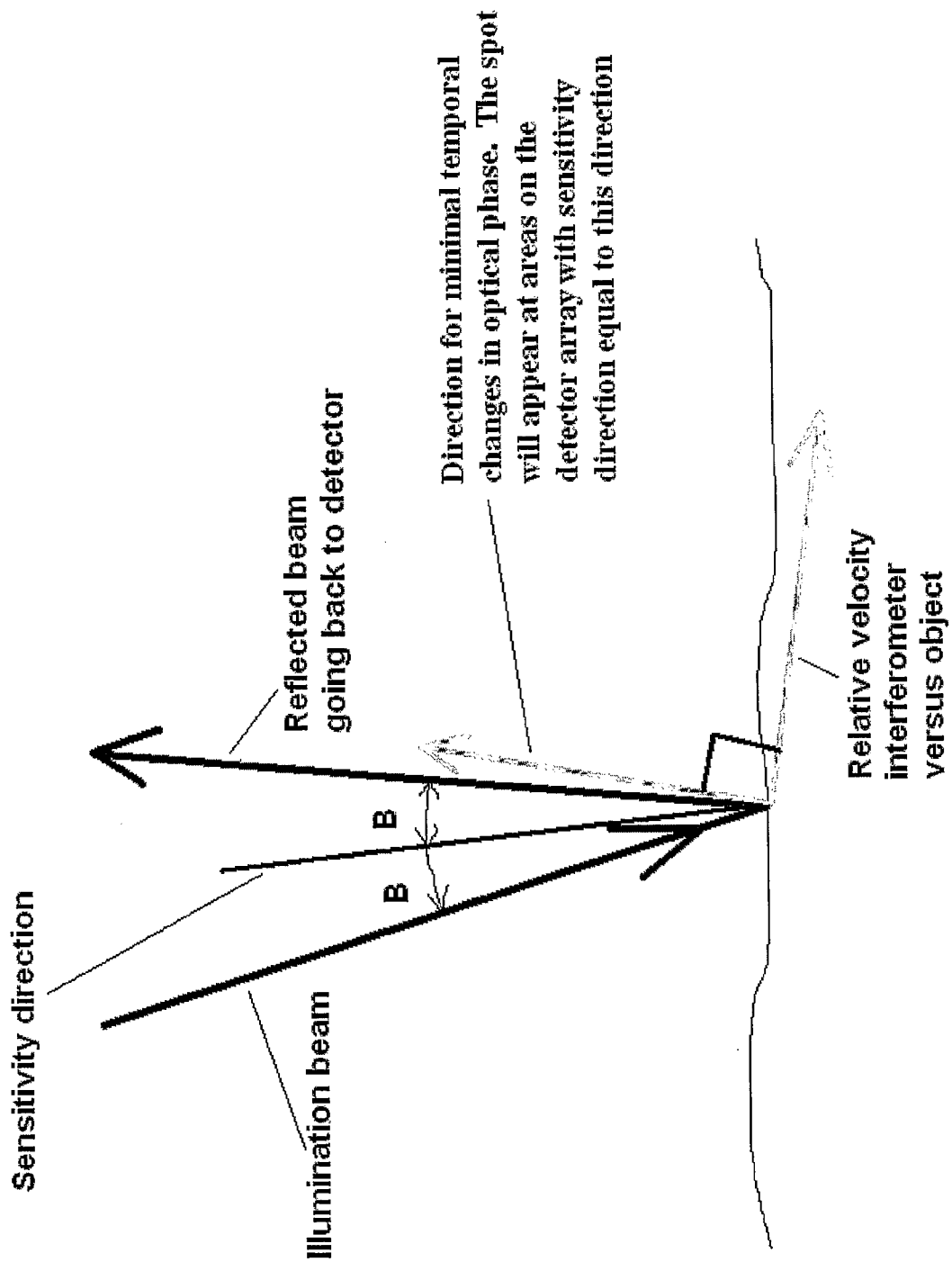
FIG. 2 illustrates the principle of interferometric sensing of the movement of particles on the sea floor.

As illustrated in FIG. 2, the interferometer is used in such a way that it identifies a direction or directions which are perpendicular to the total relative movement between interferometer and object. This is done by identifying the light ray directions with minimum temporal changes in the optical phase of the object light. When the object light is combined with a reference beam, changes in optical phase of the object light is given by changes in intensity level of the cross interference term. In other words, the interferometer identifies directions with minimum temporal intensity variations, by analysing the signal across the detector array.

This can be done by using a relatively slow detector array (with relatively long exposure time), where very fast temporal variations in intensity are averaged away, since the fast intensity variations can not be temporally resolved by the slow detector array. Hence, the contrast in the speckle pattern (cross interference term) will be high only for directions which are perpendicular to the direction of the relative movement between object and interferometer. It is also possible to use a fast detector array which can resolve faster intensity variations, to use data across the whole detector array to identify areas with slow intensity fluctuation.

If the interferometer is moving with a linear and constant velocity, then the direction of the relative movement between interferometer and object will change if the object is moving or vibrating with a displacement component towards the interferometer. These directional changes can be detected by the interferometer, and hence, seismic movements or other object movements can be detected and quantified.

Figure 3:
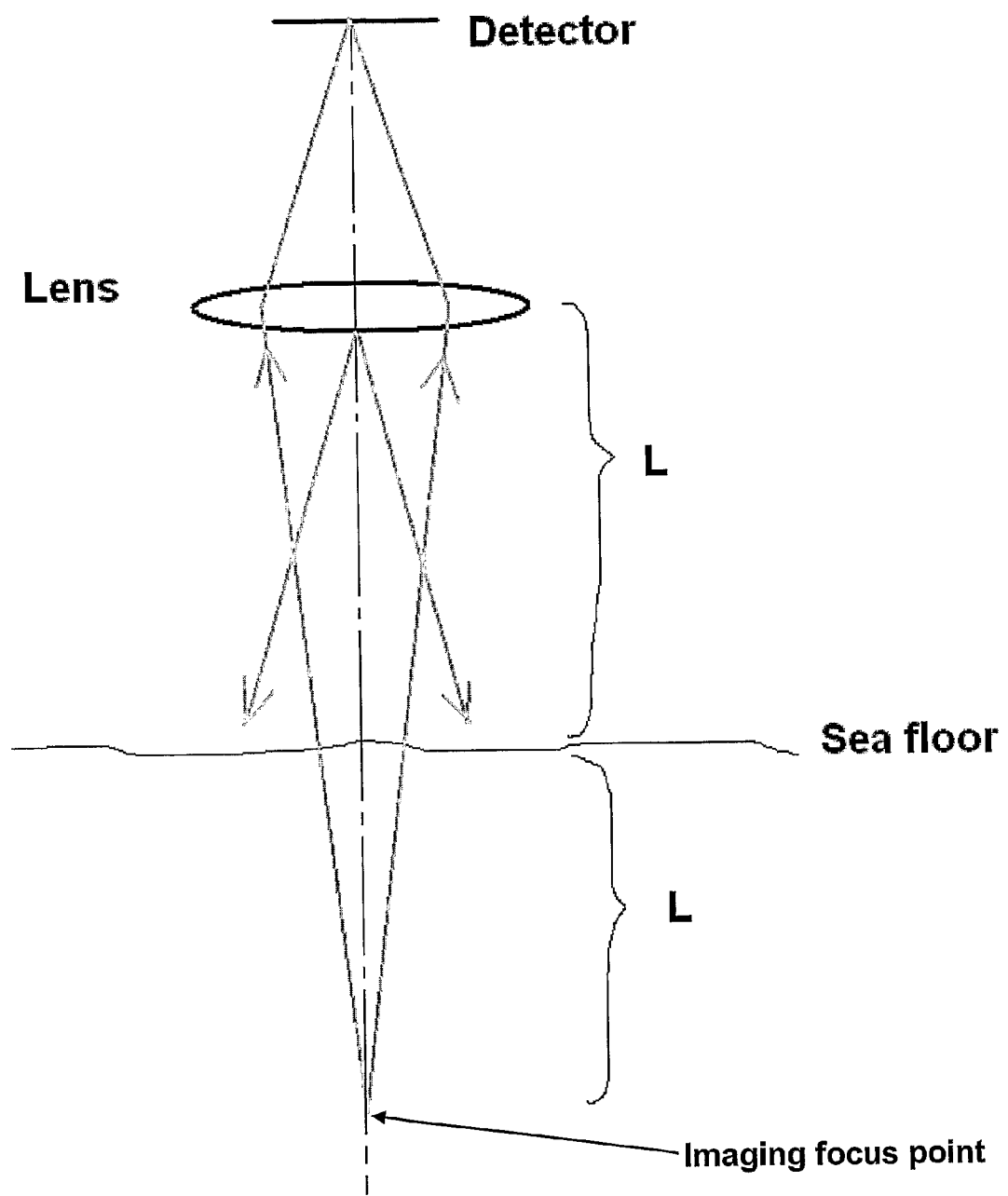
FIG. 3 illustrates an embodiment of an interferometer arrangement, using a diverging object beam, and with the imaging system focused to a point below the sea floor.

An embodiment of an interferometer is shown in FIG. 3, in which the object beam is diverging, and the imaging system is focused to a point beneath the sea floor.

Theoretically, it should be possible to use new optical configurations to amplify the sensitivity of the system, since we need to find optical configurations which are such that the sensitivity direction for incoming light at one edge of the detector array is only very slightly different from the sensitivity direction for the incoming light at the other edge of the detector array. During our work with this principle, we discovered two important factors. This first factor is that it is preferable to focus the imaging system to a point below the sea floor, as illustrated in FIG. 3. The second factor is that we do not need to have in-line illumination and observation to obtain insensitivity to the object (sea floor) topography.

Figure 4:
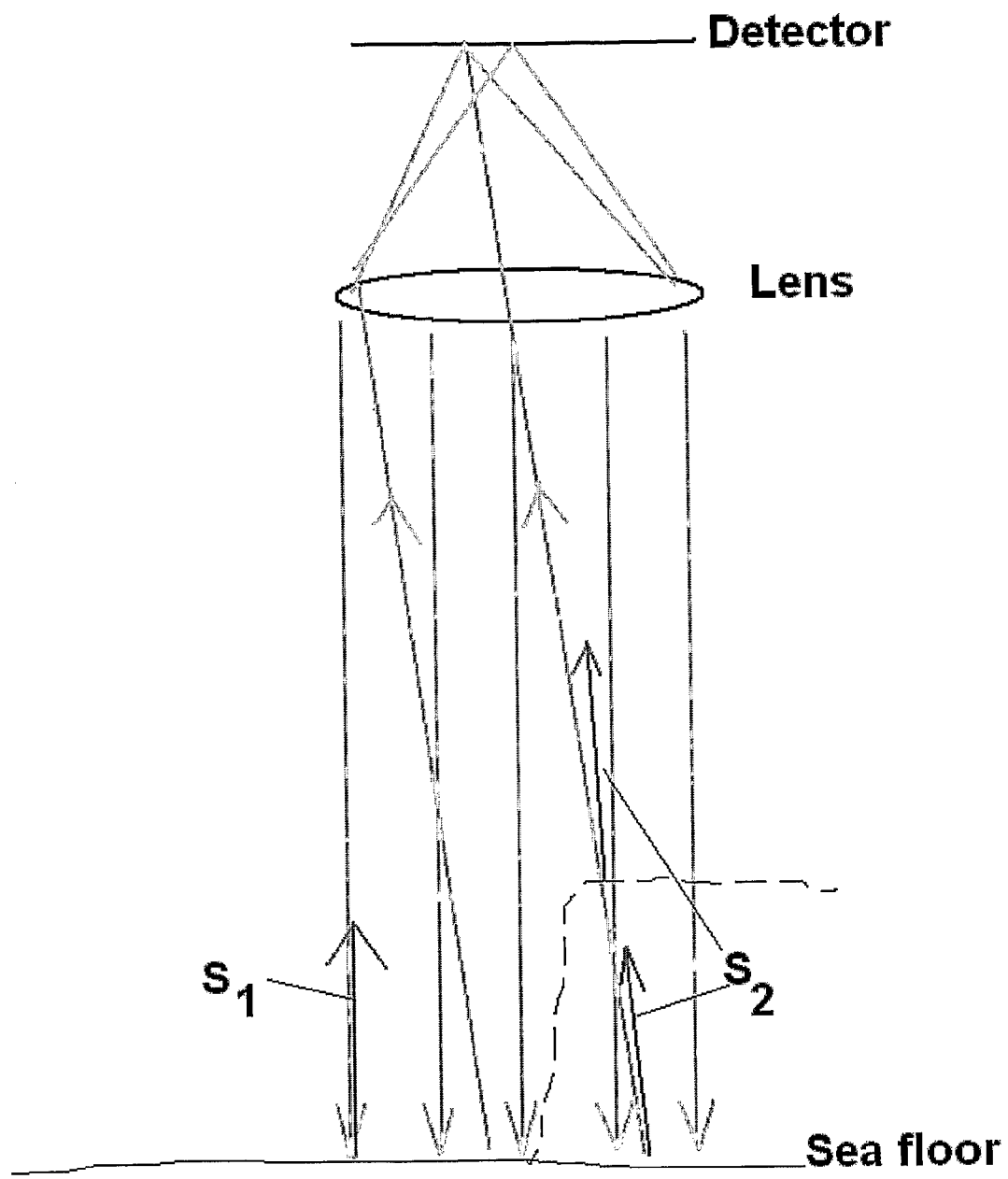
FIG. 4 illustrates another embodiment of an interferometer arrangement, using collimated illumination.

Hence, in accordance with embodiments, a solution with collimated illumination and infinite imaging has been developed. A first embodiment is shown in FIG. 4. Advantages of this configuration is that it has twice the sensitivity of the system of FIG. 3, and there is no need for focussing. In addition, problems with backscattering may also be reduced. In the present work, we also present a new configuration which we refer to as the "combined" system.

The following aspects of interferometry are of relevance with respect to the present embodiments:

Aspect 1: Different Sensitivity Direction Across Detector Array

Figure 12:
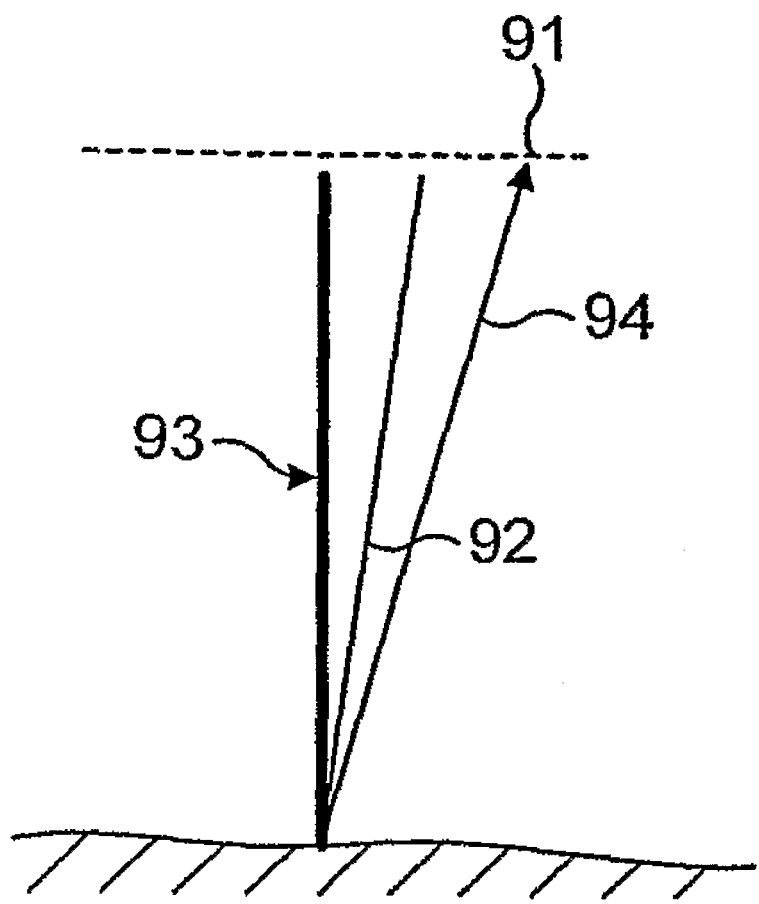
FIG. 12 illustrates the sensitivity direction of an interferometer with respect to the illumination direction and the imaging/reflected direction of the light.

When a light ray is reflected from the object and back to the detector array, this light ray will have a defined sensitivity direction with regards to object displacements. With reference to FIG. 12, the sensitivity direction 92 is in the direction half way between the illumination direction 93 and the reflected direction 94 for the light ray. The dashed line 91 represents a detector line. Light rays with a sensitivity direction perpendicular to the object versus interferometer movement direction, will have minimum temporal changes in phase and intensity. With the invention, the sensitivity direction can change from location to location on the detector array. In an embodiment, the sensitivity direction will change in a monotonian (ie monotonic) way, from one side of the detector array towards the other side of the detector array.

Generally, any optical arrangement (illumination system and imaging system in FIG. 1) which fulfils this requirement can be used with our invention.

Aspect 2: Equal Sensitivity Direction for all Beams Coming to Each Point on the Detector The object light coming to a single location on the detector array will consist of multiple light waves with different optical pathways toward and back from the object. This is valid for all points on the detector array. These light waves come through different parts of the aperture. To obtain a good signal in the interferometer, the illumination and imaging system can be arranged such that all light rays coming to a single point on the detector array have the same sensitivity direction, even if they propagate along different paths between the interferometer and the object.

Aspect 3: Insensitive to Distance Between Object (Sea Floor) and Interferometer

With reference to Aspect 2 above, we also have another preferred functionality with the invention. That is to have an equal sensitivity direction for all light waves coming to each point on the detector array, for all distances to the object. This means that the system will not be sensitive to surface topography.

Aspect 4: Sensitivity Considerations

To obtain a very sensitive interferometer, the difference in sensitivity direction from one side of the detector array to the other side of the detector array should be small. Generally, small changes in sensitivity direction will give wider spots, but larger spot movements. The width of the spot can be controlled by the exposure time of the detector array.

In embodiments, a "spot" will be created at points on the detector with a sensitivity direction normal to the direction of the linear movement between the interferometer and the sea floor. If several detector lines are located side by side to form an detector array, each detector line will have a spot, and by averaging transversally over several lines we can create a single spot with higher contrast. Expressed in other words, signals from points on the detector array with equal sensitivity direction can be averaged to obtain better spot contrast.

Some examples of optical configurations which may form embodiments of the present invention are presented below.

Example 1

FIG. 4 shows an example of an optical configuration where each single detector element along the detector line receives multiple light rays having an equal sensitivity direction. Different points along the detector line have different sensitivity directions. The lens is used both for providing collimated illumination and for imaging. S1 and S2 are sensitivity directions for different beams.

Example 2

Figure 5:
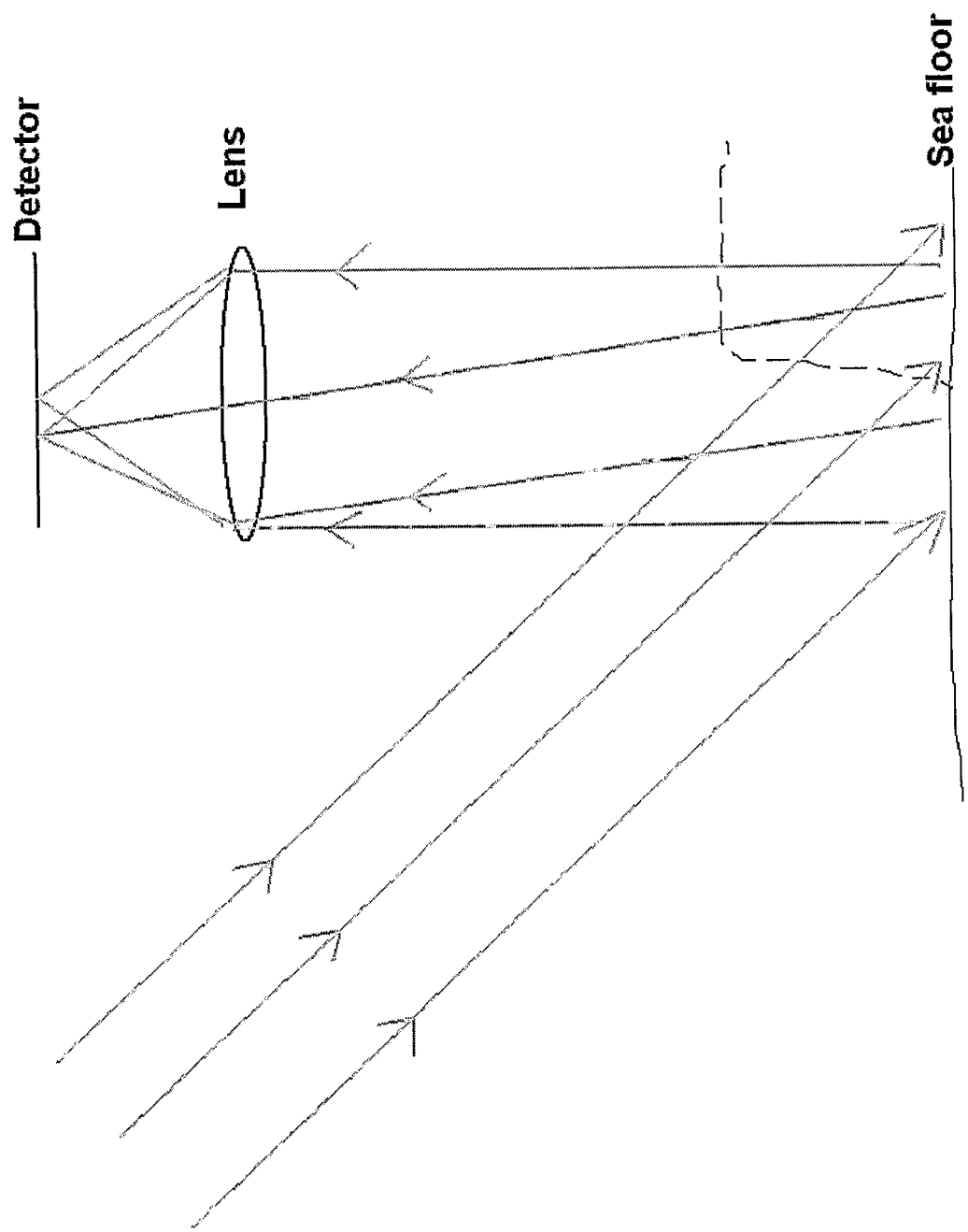
FIG. 5 illustrates a further embodiment of an interferometer arrangement, also using collimated illumination.

FIG. 5 shows another example with collimated illumination. This configuration is similar to that of Example 1 (FIG. 4), but the illumination is provided externally from the imaging system.

New Interferometer Design

Figure 6:
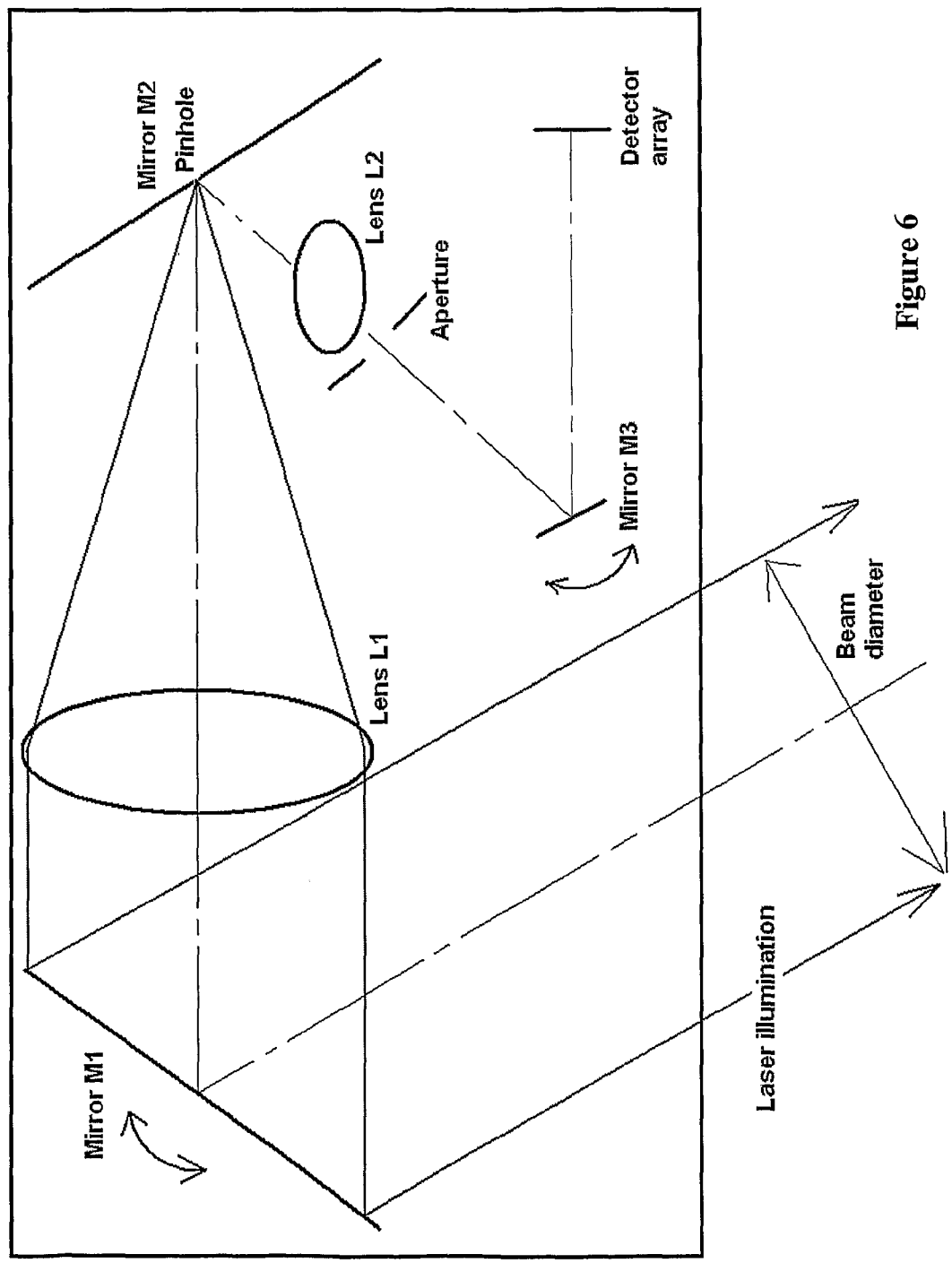
FIG. 6 illustrates an interferometer design for providing collimated illumination and collimated imaging.

To provide collimated illumination and effectively collimated imaging requires a different interferometer design compared to earlier constructions. FIG. 6 shows our newest design. A single coherent laser source is used to generate both the object beam and the reference beam. The laser source is situated behind a partially reflective mirror M2, and is arranged to emit beams through a pinhole in the mirror M2. The object beam is formed by lens L1 and is directed outwardly, towards the sea floor, by adjustable mirror M1. The reference beam is formed by lens L2 and the accompanying aperture, and is directed by mirror M3 to the detector array. The reflected object beam passes back along the same optical path as the outgoing object beam and is combined with the reference beam when reaching the detector array.

The detector in this system can have small pixels in the center and larger towards the edge. By putting another aperture into the system, we can also obtained a controlled vignetting effect, to obtain a speckle size which corresponds to the larger pixel size at the edge of the detector array.

When designing the interferometer, it is important to take into consideration the density of the interferometer, its support cylinder and the outer metal cylinder all together. This is because the weight of this system should not exceed the weight of water the same volume. If the interferometer and the support cylinder becomes too heavy, this can be compensated by making the outer metal cylinder longer.

Some Typical or Estimated Data for Beam Size, Detector Size and Dynamic Range

If we are using an effective focal length of 1 meter, and a F-number of 25, then the imaging aperture a by lens L1 is 4 cm. As long as we use infinite imaging (i.e. "collimated" imaging) the imaging area on the sea floor will also be 4 cm, at least if the beam is directed vertically downward. If the beam diameter in the x-direction (see FIG. 6) is A, then the dynamic range in terms of angle for reflected light becomes $$\text{Alpha} = \pm \frac{(A - 4 \text{ cm})}{2L}$$

where L is the distance to the sea floor.

If Alpha exceeds the value given above, then we will have less light reflected, as the imaging area goes outside the illuminated area. Since the sensitivity direction is halfway between the illumination direction and the imaging direction, the dynamic range Beta in terms of sensitivity direction becomes $$\text{Beta} = \pm \frac{(A - 4 \text{ cm})}{4L}$$

If the interferometer in FIG. 6 has an effective focal length of 1 meter, then the spot movement on the detector array will have an dynamic range of $$dd = \pm \frac{(A - 4 \text{ cm})}{2L}$$

In other words, the spot moves twice what it would do with the setup of FIG. 3, or alternatively, we have obtained double sensitivity. With an illumination spot diameter A of 10 cm this gives a maximum possible spot movement on the detector of +/−1 mm for a distance L of 30 meters, and maximum of +/−15 mm for a distance L of 2 meters. In other words, the new configuration gives us a limited maximum spot movement for long distances to the sea floor; the maximum spot movement with L=30 meters is +/−100 pixel-to-pixel distances (p-p) before we have to reposition the spot by using a phase modulator or by tilting a mirror.

On the other hand, the maximum spot movement is +/−1500 pp if the distance to the sea floor is 2 meters. All the considerations outline above are related to limitations as a consequence of the illumination geometry. Other limitations, e.g. related to noise levels, may give other and smaller values for the dynamic range.

Figure 7:
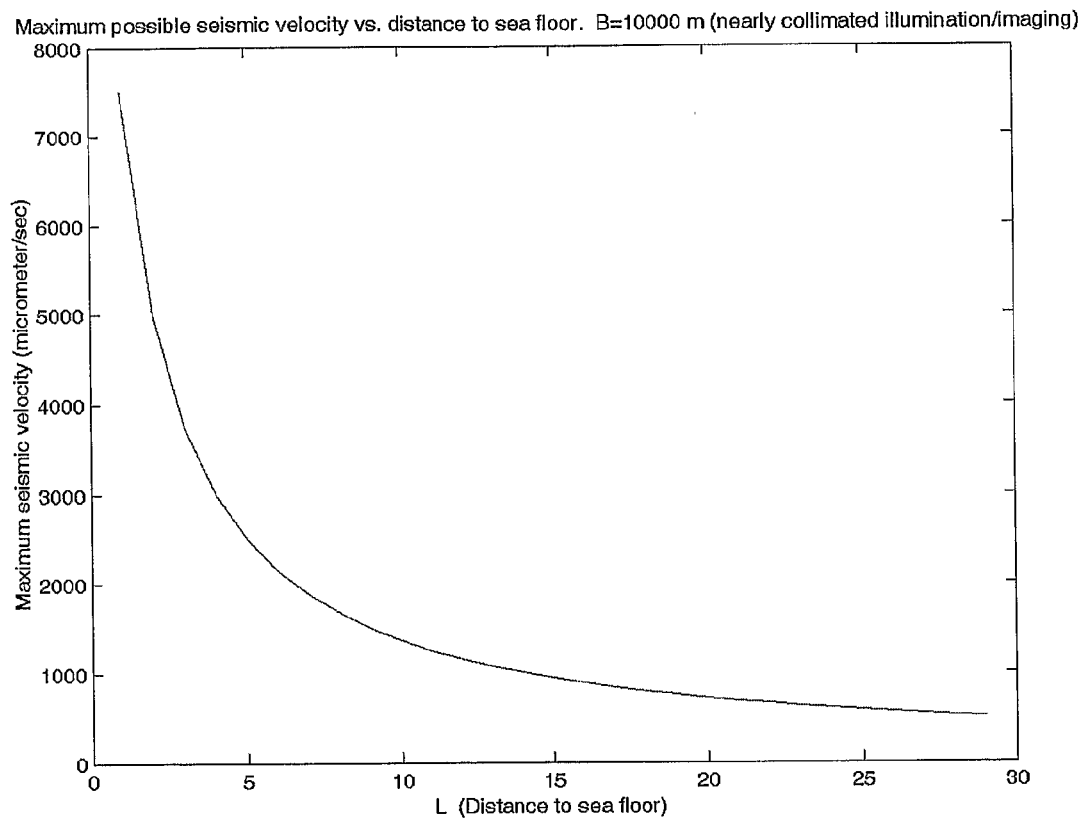
FIG. 7 is a graph showing the maximum possible seismic velocity against distance to the sea floor, using collimated illumination/imaging.

In FIG. 7 we see the dynamic range in terms of maximum seismic velocity (given directly by maximum spot movement) with the new design with collimated illumination/imaging (see FIG. 4 embodiment). We see that for small distances between interferometer and sea floor (less than 10 meters), we have a maximum possible seismic velocity of more than +/−1500 micrometers/second, while for a 30 meter distance we have about +/−500 micrometers/second maximum possible seismic velocity on the detector.

From our earlier work, we concluded that we may be able to detect spot movements corresponding to seismic velocities up to more than 2800 micrometers/second for low frequencies. This means that with the new design with collimated illumination and imaging, we will not have enough dynamic range when the distance to the sea floor is more than approximately 5 meters.

Figure 8:
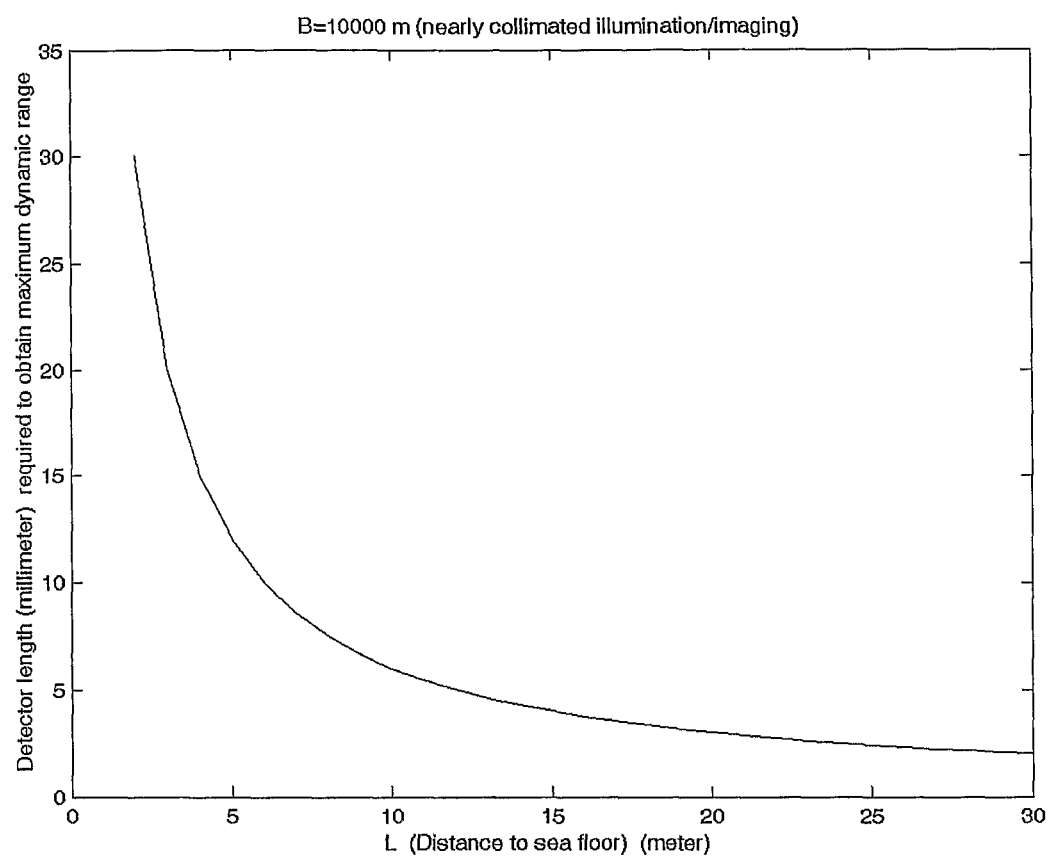
FIG. 8 is a graph showing the required detector length (plus spot width) against distance to the sea floor, using collimated illumination/imaging.

With collimated illumination/imaging, the detector array length for will be +/−1 mm=2 mm (plus the width of the spot) for a distance to the sea floor of 30 meters, while larger detector arrays should be used for smaller distances to the sea floor to obtain maximum dynamic range. This is shown in FIG. 8.

From our earlier research, we know that a typical spot will be approximately 20 pp wide, and our goal is to be able to detect spot movement down to less than 0.1 pp. Anyway, if the maximum spot movement is limited to +/−1 mm=+/−100 pixel to pixel distances (pp), more dynamic range will be needed for the spot movement, especially at the beginning of the recording when the seismic movements are relatively large. The issue is, if the spot moves outside the range of +/−100 pp (with L=30 meters), the spot contrast will be reduced and it will simply disappear.

New Optical Configuration: Combined System

Figure 9:
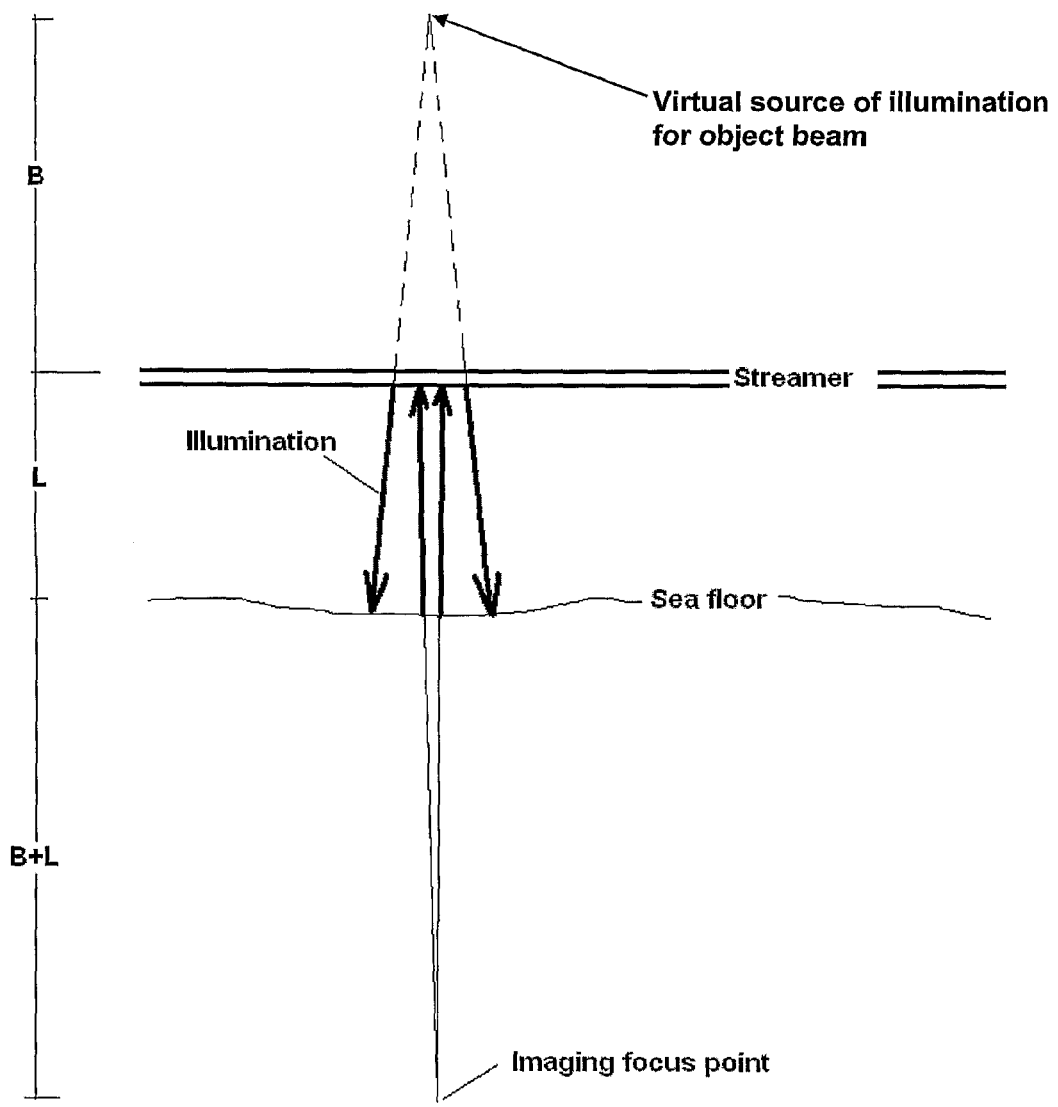
FIG. 9 illustrates a new "combined" system according to a further embodiment, having collimated or diverging illumination, and an imaging system focused to a point beneath the sea floor.

One way of solving this problem with limited dynamic range for the spot movement along the detector array, is to use a combined system where we combine the two principles outlined earlier in this description. An example of a combined system is shown in FIG. 9, which combines the use of a collimated or diverging object beam with an imaging system focused to a point below the sea floor. The beam source and the detector array are situated in a streamer. The principle in FIG. 9 is actually very close to the principle shown in FIGS. 4 and 6; only a small repositioning of two of the optical components in the system is required to go from the configuration in FIG. 6 to the configuration in FIG. 9.

In the example illustrated in FIG. 9, the illumination beam is expanded and is diverging on the way towards the sea floor, such that it apparently originates from a "virtual" source located a distance B behind (above) the interferometer. If the distance to the sea floor is L, the imaging system is focussed toward a point located (B+L) beneath the sea floor. That is, the virtual source and the imaging focus point can be arranged approximately equal distances away from the sea floor. This way, we obtain constant phase velocity in the aperture when the interferometer is moving. The principle is shown in FIG. 9.

Figure 10:
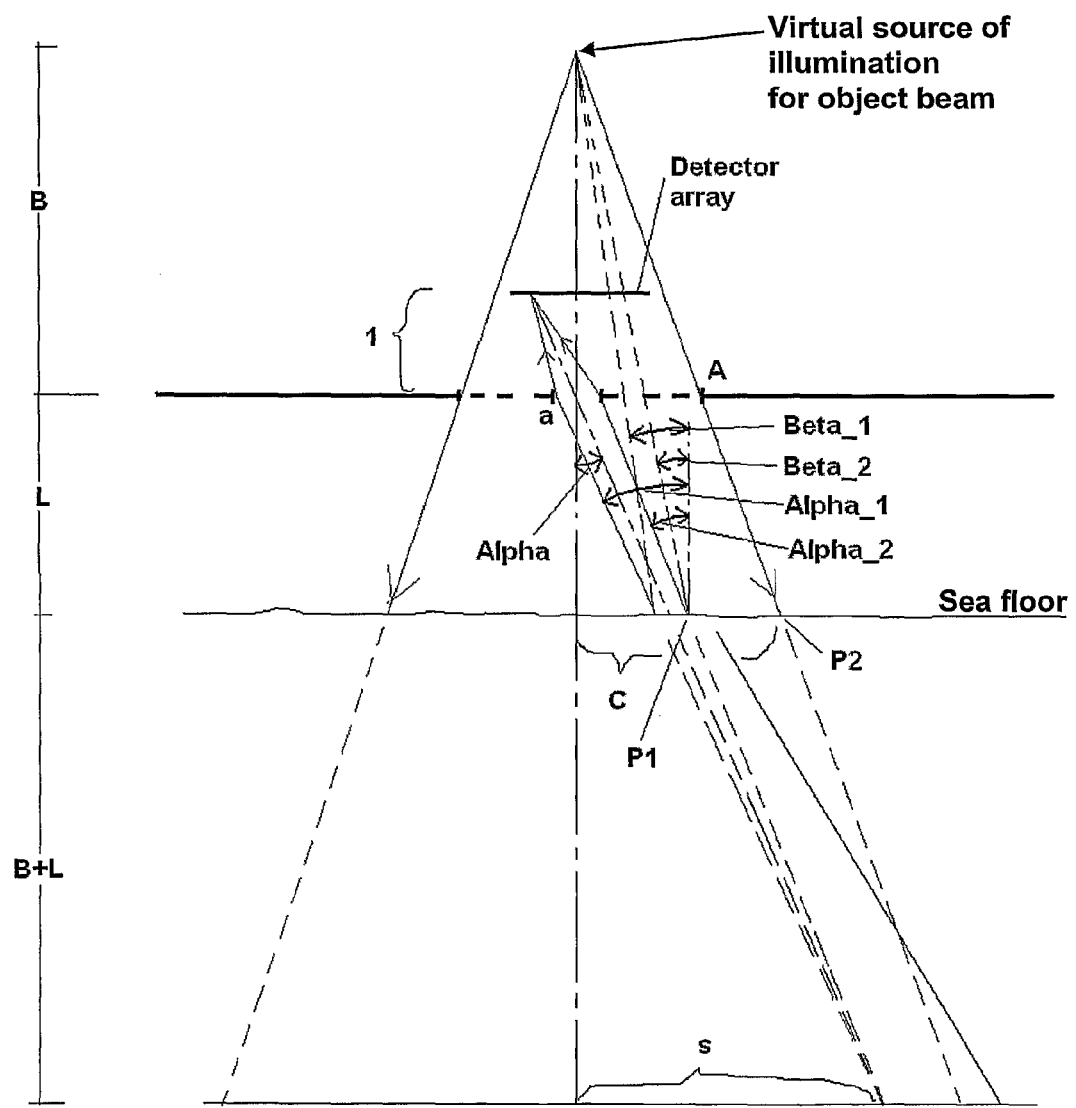
FIG. 10 illustrates the geometrical parameters of the "combined" system.

We now go through an analysis of the combined system. FIG. 10 shows the most important parameters in the combined system. With reference to FIG. 10, we now have the following equations:

$$\text{Alpha\_1} = a\tan\left(\frac{\left(s + \frac{a}{2}\right)}{(2L+B)}\right) \quad (1)$$

$$\text{Alpha\_2} = a\tan\left(\frac{\left(s - \frac{a}{2}\right)}{(2L+B)}\right) \quad (2)$$

$$\text{Alpha} = a\tan\left(\frac{s}{(2L+B)}\right) \quad (3)$$

$$\text{Beta\_1} = a\tan\left(\frac{\frac{s+a/2}{2L+B} \cdot L - a/2}{B+L}\right) \quad (4)$$

$$\text{Beta\_2} = a\tan\left(\frac{\frac{s-a/2}{2L+B} \cdot L + a/2}{B+L}\right) \quad (5)$$

The sensitivity direction for the two beams passing the aperture a by the two edges is given by Teta_1 and Teta_2 respectively (not shown in FIG. 10):

$$\text{Teta\_1} = (\text{Beta\_1} + \text{Alpha\_1})/2 \quad (6)$$

$$\text{Teta\_2} = (\text{Beta\_2} + \text{Alpha\_2})/2 \quad (7)$$

Teta_1 and Teta_2 should be equal to obtain constant phase velocity across the aperture a. This has been tested and confirmed with Matlab.

The most angular observation we can have before we start losing light efficiency, is when point P1 reaches point P2 in FIG. 10. This happens when the value of s, which is the distance out to the focus point below the surface, is equal to:

$$s = \left(c - \frac{a}{2}\right) \cdot \left(\frac{2L+B}{L}\right) + \frac{a}{2} \quad (8)$$

With the value of s given by equation (8), we now have that the maximum spot movement we can have on the detector, given by:

$$dd = \text{Alpha} \cdot 1 = \frac{s}{2L+B} \quad (9)$$

Compared to the system of FIG. 3, our new optical configuration is more sensitive. If we define a gain factor G compared to the system of FIG. 3, then G becomes:

$$G = \frac{\text{Alpha}}{\text{Teta\_1}} \quad (10)$$

This means that if the spot moves a given distance on the detector, then the corresponding seismic velocity is 1/G times the velocity we had with our earlier system (see FIG. 3). The gain factor G depends on the values of B and L. If we set B=∞, then we have the system of Example 1 (see FIG. 4) described earlier, with collimated illumination/imaging, and G becomes equal to 2. (This is the reason that, when plotting the graphs in FIGS. 7 and 8, B was set equal to 10,000 m, which is effectively infinity, to give effectively collimated illumination.) If B goes towards 0, then the gain factor G becomes equal to 1 and we have the system of FIG. 3. Thus, with collimated imaging (B=∞), we have a gain factor twice that of the system of FIG. 3.

Figure 11:
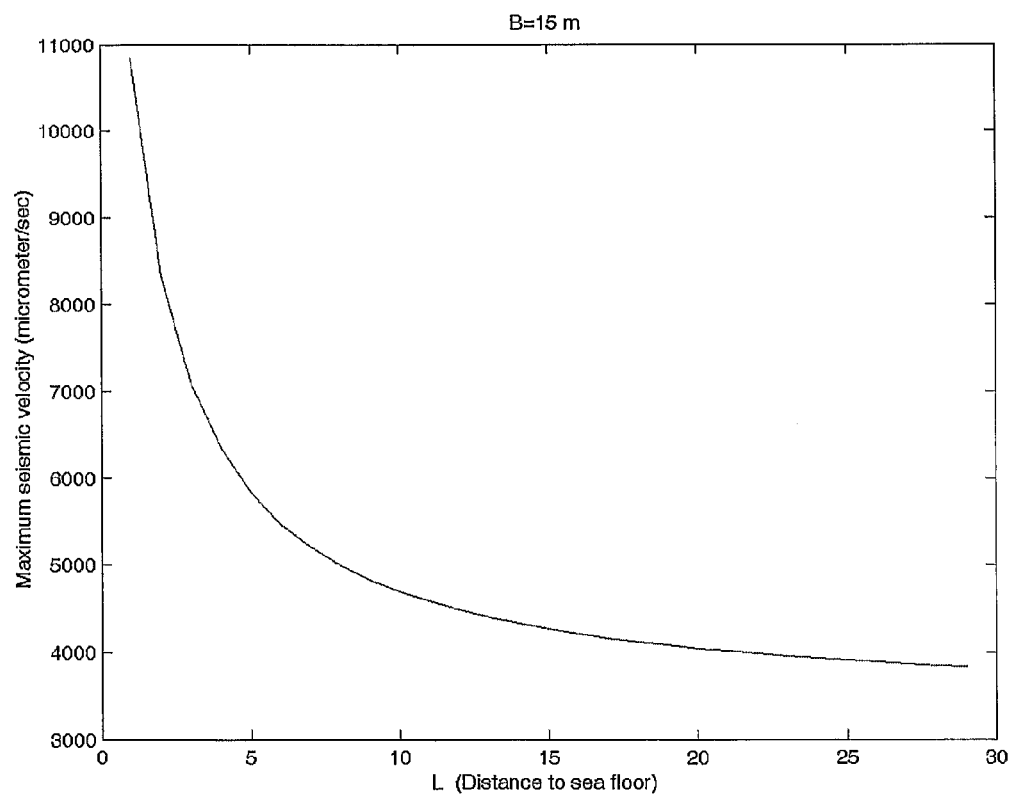
FIG. 11 is a graph showing the maximum possible seismic velocity against distance to the sea floor, using the "combined" system.

We now look at the data we get with the combined system when B=15 meters, giving a diverging beam. FIG. 11 shows the maximum seismic velocity we can obtain with this system, with different distances to L to the sea floor. As we can see, we can obtain a dynamic range from 3800 micrometers/second for L=30 m, and higher velocities for smaller distances.

This means that when we go from the collimated system to the combined system, we increase the maximum dynamic range we can have, but the sensitivity factor is somewhat reduced at the same time.

The interferometer apparatus may be in a fixed position with respect to the surface of the object being studied. Alternatively, as is typically the case with seismic exploration of the sea floor, there may be relative motion between the interferometer apparatus and the surface of the object being studied. For the apparatus described with respect to FIGS. 7, 8 and 10, the speed of the camera may be about 1 m/s.

The interferometer apparatus may be configured to measure relative motion between the apparatus and the surface of the object, using the speckle pattern formed by the combination of the reflected object beam with the reference beam. Principles for achieving this are described in WO 2006/013358, the relevant contents of which are incorporated by reference herein.

In one embodiment, the speed of movement of the interferometer apparatus, the sampling rate of the detector(s) and the size of the area of the surface illuminated by the object beam are arranged so that sequential areas of the object studied overlap.

Concluding Remarks

We have presented a new interferometer design, which may be installed inside a streamer, and new optical configurations. The main principle is a "directional interferometer", which means we can find the direction of incoming light which contains no phase velocity except speckle decorrelation.

Embodiments present advantages compared to other systems:
Easier design outline
Higher sensitivity Better signal since we have constant aperture phase velocity Fewer problems with backscattering Even less sensitivity to surface topography

The invention claimed is:

1. An interferometer apparatus for studying the surface of an object, the apparatus comprising:
   a source producing an object beam of coherent light;
   a source producing a reference beam which is coherent with the object beam; and
   an imaging system: and
   a detector;
   wherein the apparatus is arranged such that the object beam is diverging or substantially collimated;
   and wherein, in use;
   the diverging or substantially collimated object beam is directed towards the surface of the object to produce a reflected object beam reflected from the surface of the object;
   the imaging system is focused to a point beneath the surface of the object and is applied to the reflected object beam received from the surface of the object; and
   the reflected object beam is combined with the reference beam and detected by the detector.

2. The interferometer apparatus as claimed in claim 1, wherein the object beam and the reflected object beam have a common optical path.

3. The interferometer apparatus as claimed in claim 1, wherein the geometry of the object beam is as though it emanates from a point source situated behind the actual source of the object beam, and wherein the distance from the surface of the object to the said point source is approximately equal to the distance from the surface of the object to the focus point of the imaging system beneath the surface of the object.

4. The interferometer apparatus as claimed in claim 1, wherein each location on said detector has a sensitivity direction, and the sensitivity direction changes from location to location on the detector.

5. The interferometer apparatus as claimed in claim 4, wherein the sensitivity direction changes in a monotonic way, from one side of the detector, to the other side of the detector.

6. The interferometer apparatus as claimed in claim 1, arranged such that all light rays coming to a single point on the detector have a same sensitivity direction.

7. The interferometer apparatus as claimed in claim 1, wherein the detector or array has an equal sensitivity direction for all light waves coming to each point on the detector, for all distances to the surface of the object.

8. The interferometer apparatus as claimed in claim 1, configured to determine the movement of particles on the surface of the object from a sensitivity direction of the detector.

9. The interferometer apparatus as claimed in claim 1, which is moveable relative to the surface of the object.

10. The interferometer apparatus as claimed in claim 9, wherein the speed of movement of the apparatus, the sampling rate of the detector(s) and the size of the area of the surface illuminated by the object beam are arranged so that sequential areas of the object studied overlap.

11. The interferometer apparatus as claimed in claim 1, configured to measure relative motion between the apparatus and the surface from the speckle pattern formed by the combination of the reflected object beam with the reference beam.

12. The interferometer apparatus as claimed in claim 1, wherein the surface of the object is a sea floor, and the interferometer apparatus is for studying the movement of particles on the sea floor in response to a seismic event.

13. The interferometer apparatus as claimed in claim 1, wherein said detector comprises a plurality of detectors arranged in a line or array.

14. A method for conducting an interferometric study of the surface of an object, the method comprising:
   arranging a source to produce a diverging or substantially collimated object beam of coherent light;
   arranging a source to produce a reference beam which is coherent with the object beam;
   providing an imaging system;
   providing a detector;
   directing the diverging or substantially collimated object beam towards the surface of the object to produce a reflected object beam reflected from the surface of the object;
   focusing the imaging system to a point beneath the surface of the object, the imaging system being applied to the reflected object beam from the surface of the object; and
   combining the reflected object beam with the reference beam and detecting them using the detector.

15. A method as claimed in claim 14, wherein said detector comprises a plurality of detectors arranged in a line or array.

16. A method as claimed in claim 14, wherein the object beam and the reflected object beam have a common optical path.

17. A method as claimed in claim 14, wherein the geometry of the object beam is as though it emanates from a point source situated behind the actual source of the object beam, and wherein the distance from the surface of the object to the said point source is approximately equal to the distance from the surface of the object to the focus point of the imaging system beneath the surface of the object.

18. A method as claimed in claim 14, wherein each location on said detector has a sensitivity direction, and the sensitivity direction changes from location to location on the detector.

19. A method as claimed in claim 18, wherein the sensitivity direction changes in a monotonian way, from one side of the detector, to the other side of the detector.

20. A method as claimed in claim 14, wherein all light rays coming to a single point on the detector have a same sensitivity direction.

* * * * *